Nov. 8, 1932.　　C. LORBER　　1,887,163
TRACING CHART
Filed Feb. 3, 1932
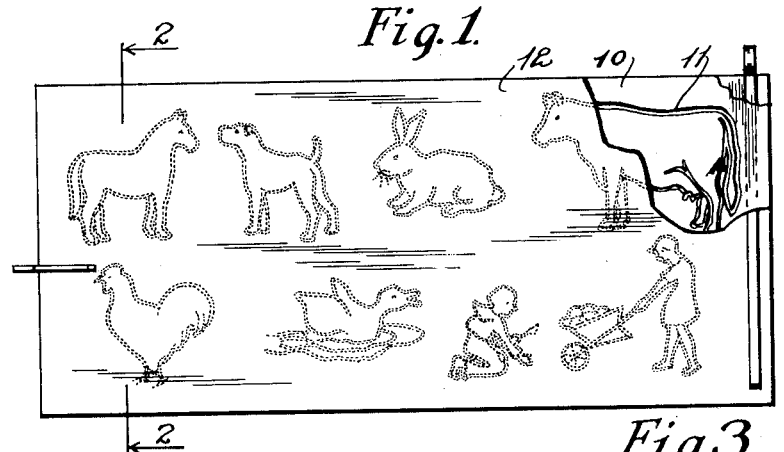
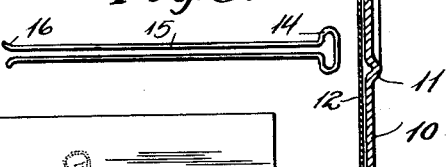
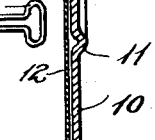
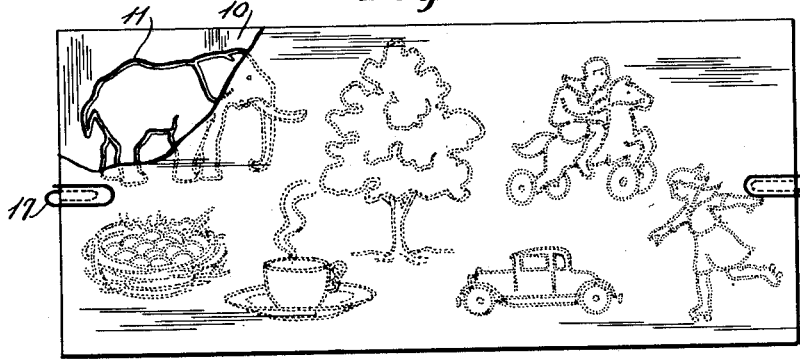
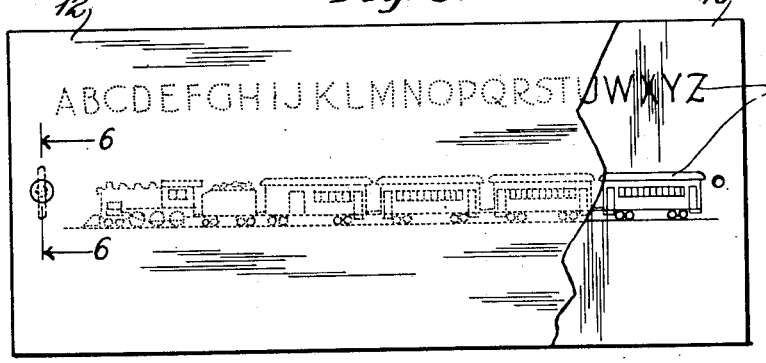
Inventor
Charles Lorber
By E. J. Clarkson
Attorney Patented Nov. 8, 1932

1,887,163

UNITED STATES PATENT OFFICE

CHARLES LORBER, OF LOUISVILLE, KENTUCKY

TRACING CHART

Application filed February 3, 1932. Serial No. 590,758.

This invention relates to educational devices and has special reference to a tracing chart.

This application is a continuation in part of my copending application for tracing chart filed August 12, 1931 and bearing the Serial Number 556,689.

One important object of the invention is to improve and simplify the tracing chart arrangements shown in my copending application aforesaid and also in my copending application filed December 22, 1931 and bearing the Serial Number 582,625 for tracing charts.

A second important object of this invention is to provide an improved arrangement of tracing chart wherein the means for securing a sheet of tracing paper on the chart will be of extremely simple character.

A third important object of the invention is to provide an improved form of tracing chart wherein the matter to be traced will be of such contrasting color to the background that it will be plainly visible through the tracing paper.

A fourth important object of the invention is to provide and improve tracing chart having the matter to be traced stamped in intaglio to present grooves to guide a pencil or other tracing implement, the grooves being in a color contrasting with the background so that they may be readily seen and followed by a young child.

It is to be understood that the word "color" as herein used is to be construed as broad enough to include black and white as well as all tints, shades and hues.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and Figure 1 is a front view of one form of the invention, a portion of the tracing paper being removed to better show the chart.

Figure 2 is an enlarged section on the line 2—2 of Figure 1.

Figure 3 is a detail view of one of the clips used with this form of the invention.

Figure 4 is a view similar to Figure 1 but showing a second form of the invention.

Figure 5 is a view similar to Figure 1 but showing a third form of the invention.

Figure 6 is an enlarged detail section on the line 6—6 of Figure 5.

Figure 7 is a longitudinal section through a portion of a fourth form of the invention.

In each form of the invention as herein disclosed the tracing chart is shown as consisting of a rectangular sheet 10 which may be made of metal, cardboard, celluloid or any other suitable material. In the forms shown in Figures 1 and 4 the matter to be traced is shown as consisting of illustrations of natural objects impressed in the sheet by intaglio lines 11 which thus form grooves for guiding a tracing implement such as a pencil or the like. The grooves thus formed are preferably colored in contrast to the body or background of the sheet so that they may readily be observed through a tracing sheet 12 of the same size and shape as the sheet 10 but made preferably of thin transparent paper.

In the form shown in Figure 6 the matter to be traced is illustrated at 13 as being simply shown on a flat sheet in contrasting color to the background. For instance, the matter may be simply printed, lithographed or otherwise shown on the chart. The tracing sheet 12 is also provided for this form.

In the form shown at Figure 1 the tracing paper is held on the sheet by means of spring clips each having an eye 14 from which extends a pair of parallel legs 15 terminating in ends 16 flaringly disposed with respect to each other. These clips may either be short as shown at the right of Figure 1 or may be long enough to extend the full width of the sheet and chart as shown at the left of Figure 1.

In the form shown at Figure 4 the tracing paper is held to the chart by one of the common forms of paper clips as shown at 17 and two of these clips may be used as there shown or there may be four clips used in which case it is desirable to have the clips located at the respective corners of the chart.

In the form shown in Figure 5 the tracing paper is held to the chart by the usual two-pronged paper fasteners 18, the chart being provided with punched openings 19 to permit such paper fasteners being used. In this case, also two or four fasteners may be used.

In the form shown in Figure 7 the tracing sheet is lapped around the edge of the chart as at 20 and held by any type of paper clip as at 21.

It is preferred to provide the charts in sets with the matter to be traced being of relatively simple character on the first chart of the set and progressively increasing in complexity in the successive charts of the set. Thus, the student begins with comparatively easy work and progresses to more and more difficult work.

Of course, with each set of charts there will be provided a quantity of correspondingly sized tracing sheets.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A tracing chart having colored grooves formed in its surface indicating matter to be traced and adapted to receive the point of a tracing implement, the color of said grooves being distinct from the color of the surface in which they are formed.

2. A tracing chart having colored grooves formed in its surface indicating matter to be traced and adapted to receive the point of a tracing implement, the color of said grooves being distinct from the color of the surface in which they are formed, in combination with a tracing sheet of thin transparent paper adapted to be forced into said grooves by the tracing implement.

3. A tracing chart having colored grooves formed in its surface indicating matter to be traced and adapted to receive the point of a tracing implement, the color of said grooves being distinct from the color of the surface in which they are formed, in combination with a tracing sheet of thin transparent paper adapted to be forced into said grooves by the tracing implement, and means for holding said sheet flat on said chart.

In testimony whereof I affix my signature.

CHARLES LORBER.